United States Patent
Srinivasan et al.

(10) Patent No.: US 11,846,348 B2
(45) Date of Patent: Dec. 19, 2023

(54) METHOD FOR AUTOMATED CALIBRATION AND ONLINE ADAPTATION OF AUTOMATIC TRANSMISSION CONTROLLERS

(71) Applicant: Ohio State Innovation Foundation, Columbus, OH (US)

(72) Inventors: Krishnaswamy Srinivasan, Columbus, OH (US); Kirti Mishra, Portland, ME (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 18/027,705

(22) PCT Filed: Sep. 23, 2021

(86) PCT No.: PCT/US2021/051739
§ 371 (c)(1),
(2) Date: Mar. 22, 2023

(87) PCT Pub. No.: WO2022/066897
PCT Pub. Date: Mar. 31, 2022

(65) Prior Publication Data
US 2023/0375085 A1    Nov. 23, 2023

Related U.S. Application Data

(60) Provisional application No. 63/082,636, filed on Sep. 24, 2020.

(51) Int. Cl.
*F16H 61/02* (2006.01)
*F16H 61/00* (2006.01)

(52) U.S. Cl.
CPC ... *F16H 61/0213* (2013.01); *F16H 2061/009* (2013.01); *F16H 2061/0087* (2013.01); *F16H 2342/02* (2013.01)

(58) Field of Classification Search
CPC ......... F16H 61/0213; F16H 2061/0087; F16H 2061/009; F16H 2342/02
See application file for complete search history.

(56) References Cited

U.S. PATENT DOCUMENTS 4,208,925 A * 6/1980 Miller .................... B60W 10/11
477/126
4,943,921 A 7/1990 Baltusis et al.
(Continued)

FOREIGN PATENT DOCUMENTS

| WO | 2018136773 A1 | 7/2018 |
|----|---------------|--------|
| WO | 2020117935 A1 | 6/2020 |

OTHER PUBLICATIONS

European Patent Office; Search Report and Written Opinion in related International Patent Application No. PCT.US2021/051739 dated Dec. 10, 2021; 14 pages.

*Primary Examiner* — Edwin A Young
(74) *Attorney, Agent, or Firm* — Wood Herron & Evans LLP

(57) ABSTRACT

Methods for automated calibration adaptation of a gearshift controller are disclosed. In one aspect, the method automates calibration of a gearshift controller in an automatic transmission having one or more speed sensors, each configured to generate a signal, and allowing one or more gearshifts with associated gearshift output sets $y_j^i$ that are functions of speed sensor signals and the desired gearshift output sets $y_{\infty}^i$. The gearshift controller has one or more gearshift control parameter sets $U_{rj}^i$ to be calibrated, each set including gearshift control parameters for an allowed gearshift at one operating condition, and learning controllers $L_i$ sets of system models $H_r$, and positive definite matrices $P_i$ for updating $U_{rj}^i$ during sequences of allowed gearshifts. The
(Continued)

method incudes acquiring speed sensor signals, computing the gearshift output set $\psi_j^i$; and updating the gearshift control parameter set $p_i$.

2 Claims, 5 Drawing Sheets

(56) References Cited

U.S. PATENT DOCUMENTS

| | | | |
|---|---|---|---|
| 6,078,856 A | 6/2000 | Malson | |
| 9,869,387 B2 * | 1/2018 | Monajemi | F16H 61/061 |
| 2008/0282583 A1 * | 11/2008 | Koellner | E02F 3/304 |
| | | | 37/348 |
| 2015/0019090 A1 * | 1/2015 | Robinette | B60W 10/02 |
| | | | 701/54 |
| 2018/0372214 A1 * | 12/2018 | Haria | F16H 61/0204 |

* cited by examiner

METHOD FOR AUTOMATED CALIBRATION AND ONLINE ADAPTATION OF AUTOMATIC TRANSMISSION CONTROLLERS

CROSS-REFERENCE TO RELATED APPLICATION

This application claims priority to and the filing benefit of U.S. Provisional Patent Application No. 63/082,636, filed Sep. 24, 2020, the disclosure of which is expressly incorporated by reference herein in its entirety.

TECHNICAL FIELD

This invention relates generally to a method for calibrating and adapting gearshift controllers in automatic transmissions and, more specifically, to a model-based learning method for automating the calibration effort and procedures for adopting this calibration method for online adaptation.

BACKGROUND

The calibration of transmission controllers in a controlled lab environment instead of a test track represents front-loading of the calibration effort, as the time and effort spent by a calibration engineer in the vehicle on a test track is dramatically reduced in this method of calibration. Such methods allow calibration of transmission controllers before integration of the transmission with the engine and other vehicle systems. Front loading of the calibration effort is often done using transmission dynamometers (and sometimes chassis dynamometers), where gearshifts can be commanded at different operating conditions in a controlled and automated manner.

Minimally, a dynamometer under electronic control for scheduling a preplanned sequence of gearshifts is required for automated calibration of gearshift controllers. The dynamometer can either be a transmission or chassis dynamometer. If done on a chassis dynamometer, typically, the mechanism of securing the vehicle to the ground has a load cell for measuring the vehicle acceleration during a gearshift, which is used for objective evaluation of the shift. In one available automated calibration method, the test plans generated by a calibration engineer using design-of-experiments (DoE) approaches are preprogrammed into the dynamometer and using the vehicle sensor data acquired during this automated testing, the calibration parameters, better known as calibration labels, are optimized post-testing for all the allowed gearshifts at different operating conditions. A typical DoE approach involves conducting a gearshift at different control inputs, and choosing the optimum based on objectively evaluated (such as on a scale of 1 to 10) performance indices such as shift spontaneity and shift comfort, collectively represented as shift-quality.

Automatic transmissions with 8, 9, and 10 speeds require much more calibration effort as compared to older transmissions with 4-5 speeds, as the total number of legal/allowed gearshifts increases steeply. For example, a 10-speed GM™ transmission allowing 26 gearshifts requires 22,000 calibration labels as opposed to 800 calibration labels required by a 4-speed transmission that allows 6 gearshifts. While some of these labels are scalar values, others are two-dimensional look-up tables with multiple values. As described, a typical DOE approach involves conducting a gearshift at different control inputs, resulting in the large number of gearshifts required for the automated calibration of gearshift controllers in transmissions with a greater number of transmission speeds.

The DoE-based calibration method is essentially a combination of modeling (system identification) and optimization (using the identified model), implying that the method used for initial (factory) calibration of a transmission controller cannot be used for online adaptation during normal driving, as a model of the system that changes over time due to wear and use is impossible to generate online using DoE approaches. This aspect of the DoE-based calibration approach requires additional calibration effort for tuning of the adaptive routines that learn the system behavior, and correct for the changed behavior, over a sequence of gearshifts.

In automatic transmissions, a set of offgoing clutches are released (or disengaged) and another set of oncoming clutches are engaged during gearshifts. As a special case, in clutch-to-clutch gearshifts, one clutch is released, and another one is engaged. Typically, the hand-off between the set of offgoing clutches and oncoming clutches is controlled in different phases. Each phase is controlled using a set of gearshift control parameters that should be tuned to achieve the desired control objective during that phase. Control performance in a particular phase, in addition to depending on the gearshift control parameters of that phase, also depends on the gearshift control parameters of the preceding phases. In published PCT application WO 2020/117935A1 titled "Method for Automated Calibration and Adaptation of Automatic Transmission Controllers", the inventors proposed a sequential phase-by-phase method for calibrating and adapting gearshift control parameters, wherein for a sequence of gearshifts performed on a dynamometer repetitively, performance of the control parameters determining the gearshift response during a particular phase (or control objective satisfaction in that phase) is first checked for each gearshift in the sequence of gearshifts performed after every repetition, which if found satisfactory, the check is performed for the next phase, and if not found satisfactory, the control parameters for that phase are updated (or corrected). The process of check-and-update is repeated till all the control parameters for each gearshift in the sequence of gearshifts performed are iteratively learned, resulting in good gearshift response of each gearshift in the sequence of gearshifts performed. This sequential method of gearshift calibration and adaptation, while being suitable for the application of adaptation, may require a greater number of gearshifts to be conducted for automated calibration of gearshift controllers.

Known automated calibration and online adaptation of gearshift controllers indicate that state-of-the-art techniques for automated calibration relies heavily on DoE based approaches, and for online adaptation, on rule-based adaptive policies.

What is needed is a model-based learning approach that simultaneously learns all the gearshift control parameters, resulting in an automated calibration procedure requiring a substantially lower number of gearshifts for transmission control calibration and adaptation.

SUMMARY

To these and other ends, in one embodiment, the invention includes a method for automated calibration of a gearshift controller in an automatic transmission having one or more speed sensors, each configured to generate a signal, and allowing one or more gearshifts with associated gearshift output sets $\mathcal{Y}_j^i$ that are functions of the speed sensor signals and desired gearshift output sets $\mathcal{Y}_\infty^i$, the gearshift controller having one or more gearshift control parameter sets $U_{rj}^i$ to be calibrated, each set including gearshift control parameters for an allowed gearshift at one operating condition, and learning controllers $L_i$, sets $H_i$ of system models $H_i$, and positive definite matrices $P_i$ for updating $U_{rj}^i$ during sequences of allowed gearshifts, the method comprising:

(a.) acquiring speed sensor signals post-completion of one gearshift from a sequence of allowed gearshifts;
(b.) computing a gearshift output set $\mathcal{Y}_j^i$ using the acquired speed sensor signals; and
(c.) updating the gearshift control parameter set $U_{rj}^i$ according to (i.) and (ii.) for a next gearshift in the sequence of gearshifts.

$$U_{rj+1}^i = U_{rj}^i + L_i(\mathcal{Y}_\infty^i - \mathcal{Y}_j^i) \quad \text{(i.)}$$

$$(I - L_i H_i)^T P (I - L_i H_i) - P < 0, \text{ for all } H_i \text{ in } H_i. \quad \text{(ii.)}$$

In another embodiment, the invention includes a method for adaptation of a gearshift controller in an automatic transmission having one or more speed sensors, each configured to generate a signal, and allowing one or more gearshifts with associated gearshift output sets $\mathcal{Y}_j^i$ that are functions of speed sensor signals and desired gearshift output sets $\mathcal{Y}_\infty^i$, the gearshift controller having one or more gearshift control parameter sets $U_{rj}^i$ for control of the allowed gearshifts during vehicle operation and stored in look-up tables as functions of one or more operating conditions $\mathcal{C}^i$, and learning controllers $L_i$, $H_i$ sets of system models $H_i$, and positive definite matrices $P_i$ for updating $U_{rj}^i$ during a sequence of allowed gearshifts, the sequence of the allowed gearshift occurring at operating conditions $\mathcal{C}_j$, that are same or different than $\mathcal{C}^i$, the method comprising:

(a.) acquiring speed sensor signals post-completion of an allowed gearshift at an operating condition $\mathcal{C}_j 1$;
(b.) computing a gearshift output set $\mathcal{Y}_j^i$ using the acquired speed sensor signals;
(c.) computing a correction $\delta u_j$ according to (i.) and (ii.) for a next gearshift in the sequence of gearshifts; and $$\delta u_j = L_i(\mathcal{Y}_\infty^i - \mathcal{Y}_j^i) \quad \text{(i.)}$$

$$(I - L_i H_i)^T P (I - L_i H_i) - P < 0, \text{ for all } H_i \text{ in } H_i \quad \text{(ii.)}$$

(d.) distributing the computed correction $\delta u_j$ to the control parameter sets $U_{rj}^{i-1}$ and $U_{rj}^i$ corresponding to one or more operating conditions $\mathcal{C}^{i-1}$ and $\mathcal{C}^i$ that surround and are closest to the operating condition $\mathcal{C}_j$ for the allowed gearshift.

Other embodiments in accordance with the invention are described below.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION

Figure 1:
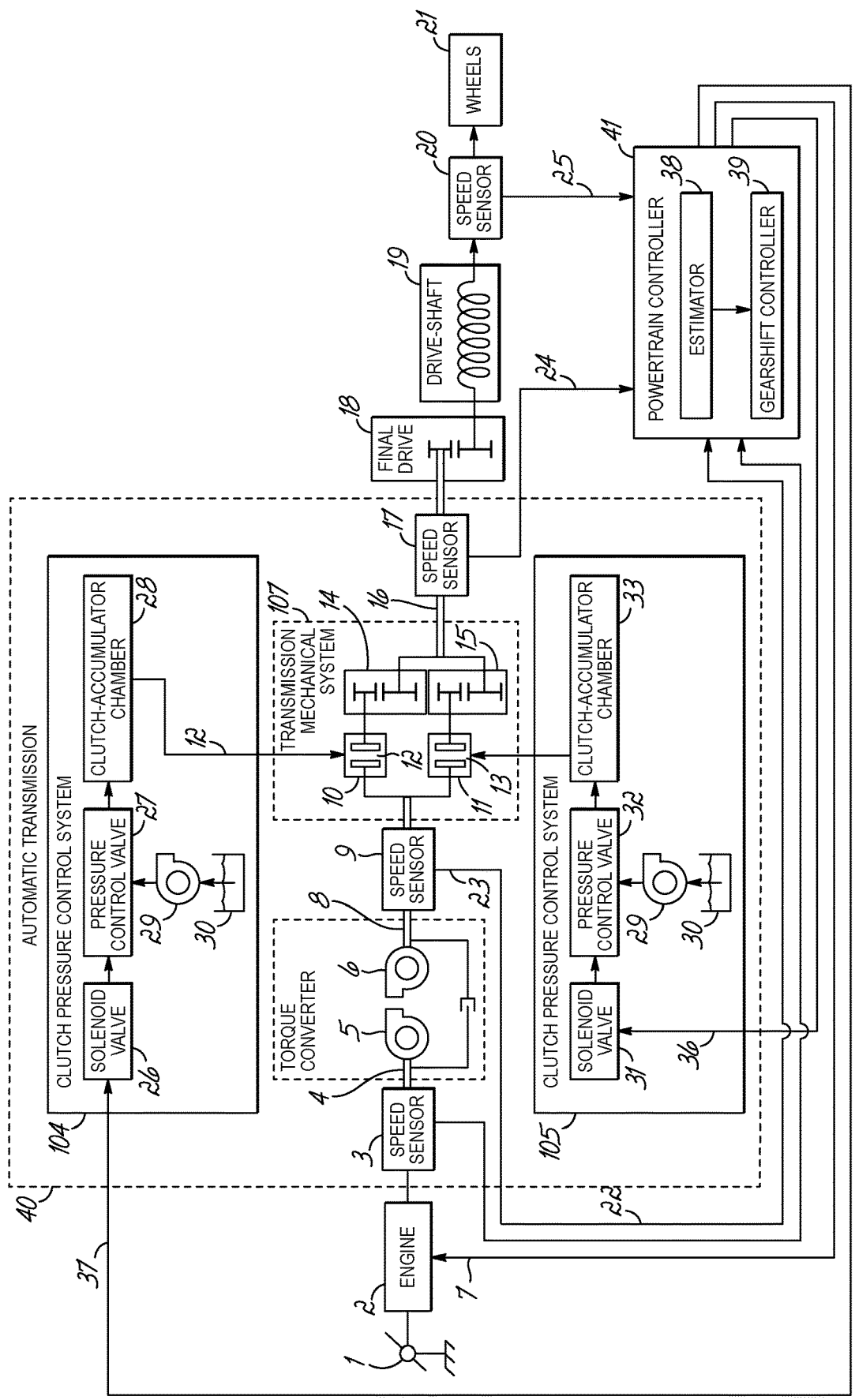
FIG. 1 is a schematic representation of the physical architecture of the automotive powertrain incorporating one embodiment of the invention.

FIG. 1 is a schematic representation of the architecture of a powertrain with an engine 2 as the prime mover, a three-element torque converter with a pump 5 and a turbine 6, a stepped automatic transmission 40 includes a mechanical system 107 and clutch pressure control systems 104 and 105, a final drive planetary gear set 18, a compliant drive shaft 19, and vehicle inertia lumped at wheels 21. In addition to these components, there are speed sensors 3, 9, 17, 20 mounted on the shafts 4, 8, 16, and 19, respectively. These speed sensors 3, 9, 17, 20 send information to a powertrain controller 41 containing a controller 39 and an estimator 38 that includes routines, which are mathematical functions coded into an appropriate micro-processor. The speed sensors 3, 9, 17, 20 sense the speeds of the pump 5, the turbine 6, the transmission output, and the wheels, respectively. The engine 2 receives throttle angle commands from the driver through the accelerator pedal 1 or, alternatively, a throttle position controller (not shown). The powertrain controller 41, based on calculations to be described later, sends the throttle angle and/or a spark advance command 7 to the engine 2. Also, as will be described later, the powertrain controller 41 performs calculations to generate commands 36, 37 for solenoid valves 31 and 26 controlling an offgoing clutch 11 and an oncoming clutch 10.

With continued reference to FIG. 1, the automatic transmission 40 includes a mechanical system 107 and clutch pressure control systems 104 and 105. The mechanical system 107 includes the two clutches involved in a clutch-to-clutch (CTC) shift, more specifically the offgoing clutch 11 and the oncoming clutch 10. Boxes 14 and 15 represent the gear ratios in the paths of the oncoming and offgoing clutches 10, 11. Oncoming and offgoing clutches 10, 11 are manipulated through clutch pressures 12, 13 generated by clutch pressure control systems 104, 105. The clutch pressure control systems 104, 105 include solenoid valves 26, 31, which control pressure control valves 27, 32, which in turn control pressures in the clutch-accumulator chambers 28, 33. The motion of the spools (not shown) in the pressure control valves 27, 32, in conjunction with the main line pressure generated by a pump 29 connected to an oil reservoir 30 modulates the pressures in the clutch-accumulator chamber 28, 33.

Figure 2:
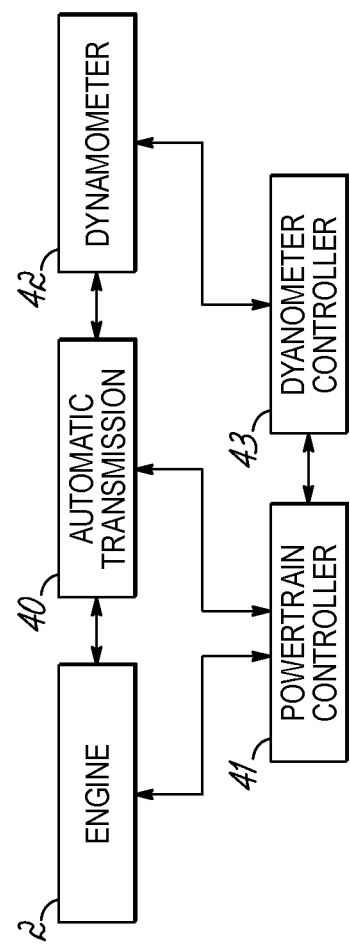
FIG. 2 is a schematic representation of one embodiment of the physical setup required for automated calibration of gearshift controllers.

FIG. 2 is a schematic representation of one embodiment of the physical setup required for implementing an embodiment of the invention. The engine 2 and the automatic transmission 40 are mounted on a dynamometer 42. The load torque generated by the dynamometer 42 is controlled electronically using a dynamometer controller 43, and the power produced by the engine 2 and gear shifting in the automatic transmission 40 are controlled electronically using the powertrain controller 41. The two controllers 41 and 43 coordinate to execute a preplanned sequence of gearshifts in a controlled and automated fashion without any human supervision. It is advantageous for the physical setup to accurately reproduce gearshifts at the desired operating conditions in order to properly implement the invention.

Figure 3:
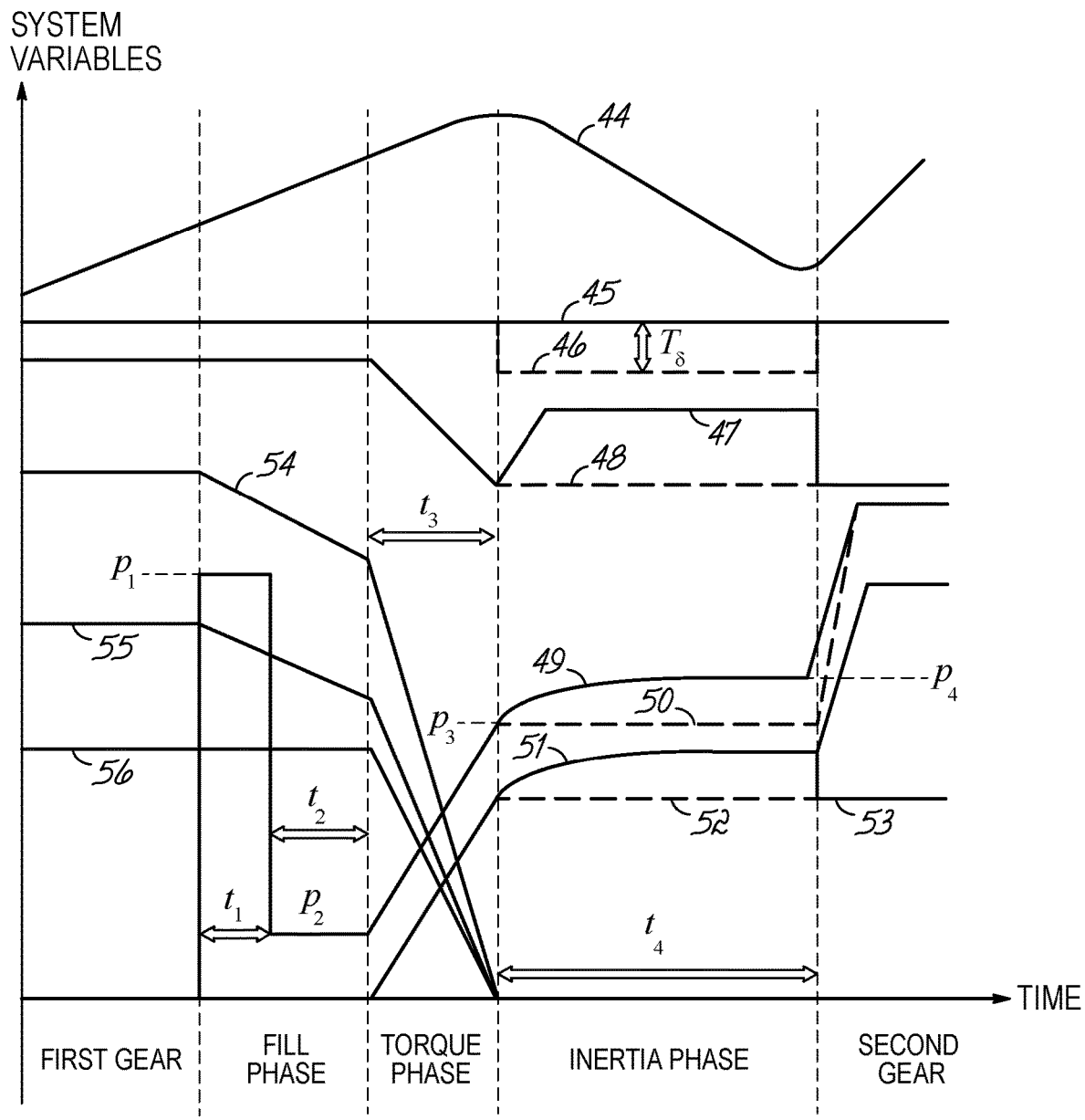
FIG. 3 is a schematic representation of several system variables—engine speed, engine torque, transmission output torque, commanded oncoming and offgoing clutch pressures, and oncoming and offgoing clutch torque capacities and torques, during a power-on 1-2 upshift.

One embodiment of the invention will be described using an example of a power-on upshift, and directions will be given to adopt that example to other types of gearshifts. FIG. 3 is a schematic representation of the primary system variables during a 1-2 power-on upshift for two cases—first, with the constant engine torque command 45 and manipulated oncoming clutch pressure command 49, and second, manipulated engine torque command 46 and constant oncoming clutch pressure command 50 during the inertia phase. The system variables are represented by the dashed and solid lines respectively for the cases with constant and manipulated engine torques. These two methods of gearshift control result in a constant 48 or a variable 47 driveshaft torque and a constant 52 or variable 51 oncoming clutch torques. The offgoing clutch control remains the same for both cases, resulting in the same trajectories of the commanded offgoing clutch pressure 54, offgoing clutch pressure 55, and offgoing clutch torque 56 for both cases.

At the initiation of a power-on upshift, the oncoming clutch is filled with transmission fluid and the clutch piston stroked, reducing the clearance between the plates of the clutch pack to zero, and marking the end of the fill phase. The moment at which the clearance between the clutch plates reduces to zero, or the plates kiss, is called the kiss point. The oncoming clutch starts transmitting torque after the kiss point, which marks the beginning of the torque phase. With reference to FIG. 3, typically, the oncoming clutch pressure command during the fill phase includes a sequence involving a higher amplitude pulse $p_1$ followed by a lower amplitude pulse $p_2$, enabling quick fill followed by gentle stroking of the clutch piston.

Following the clutch fill phase, the transmission system enters the torque phase, where the oncoming clutch pressure command is ramped-up to a pressure $p_3$ in $t_3$ time units, transferring the load from the offgoing to the oncoming clutch. This is shown by the decreasing offgoing clutch torque 56 during the torque phase, where because load is transferred from the path of higher gear ratio to one with a lower gear ratio, the driveshaft torque 47, 48 drops if the turbine torque is relatively unchanged 45, 46, as shown in FIG. 3. During this phase, the controller would ideally keep the torque capacity of the offgoing clutch 55 higher than the torque 56 transmitted by it, and reduce it to zero, i.e., fully release the clutch, exactly when the torque transmitted by the offgoing clutch becomes zero, marking the end of the torque phase and the beginning of the inertia phase. While this occurs naturally in older transmissions equipped with one-way clutches, achievement of the same result by electronic control of the offgoing clutch continues to be a challenge, especially in the absence of feedback signals containing information on the progress of the load transfer, due to the absence of torque sensors or even pressure sensors. If the offgoing clutch is released sooner or later than the instant at which the offgoing clutch torque becomes zero, the engine speed flares or is pulled down due to loss or excess of the driving load respectively, both events resulting in a larger drop in the output torque during the gearshift, which leads to loss of passenger comfort During the inertia phase, the oncoming clutch pressure command 49 is further increased to $p_4$ in $t_4$ time units, which increases the driveshaft torque 47 and decelerates the engine, resulting in a decrease of engine speed 44, as shown in FIG. 3. Because of kinematic constraints, the deceleration of the input shaft is reflected in the decrease of the oncoming clutch slip, which goes to zero resulting in clutch lock-up, at which moment the reaction torque 53 at the oncoming clutch drops below clutch torque capacity 51, marking the end of the gearshift. If the rate of change of clutch slip speed is large at clutch lock-up, the driveline is excited post lock-up, resulting in low gearshift quality. A gearshift of low quality is characterized by a large change in the vehicle acceleration perceived as jerk by the occupants of an automotive vehicle. A gearshift of low quality can also be characterized by long gearshift duration resulting in low spontaneity and sluggish vehicle response to driver command leading to bad drivability. A gearshift of high quality is characterized by low vehicle jerk and spontaneous vehicle response. Consequently, one of the objectives for inertia phase control is to ensure a smooth clutch lock-up. It is also customary to reduce engine torque 46 during the inertia phase, which results in reduced variation of the output shaft torque 48 during this phase. Integrated control of the engine and hydraulic clutches during a gearshift is referred to as integrated powertrain control.

As part of the method, the offgoing clutch control is assumed calibrated, resulting in reduction of the offgoing clutch torque capacity 55 according to a prescribed set of rates. Using the method for automated calibration and online adaptation, the oncoming clutch and engine torque control parameters are iteratively learned to coordinate with this offgoing clutch control resulting in gearshifts of higher quality. More specifically, the control parameters specifying the commanded oncoming clutch pressure and engine torque trajectories, $p_1$-$p_4$, $T_\delta$, and $t_1$-$t_4$, are iteratively learned using a model-based learning technique.

The automated calibration method that simultaneously calibrates all the control parameters of a gearshift is explained here using the example of power-on upshifts, however, extensions to other types of gearshifts such as power-off upshifts, power-on downshifts, and power-off downshifts will be clear to someone skilled in the art. It is customary to calibrate the fill phase control parameters $p_1$ and $p_2$ separate from, and prior to, the calibration to torque and inertia phase control parameters—$p_3$ and $p_4$. Thus, in what follows, simultaneous calibration method of $p_3$ and $p_4$ will be described.

A reduced order model of the powertrain during the torque and inertia phases of a 1-2 power-on upshift is developed for control design, described in equations (1) and (2), with the following assumptions. First, the torque converter clutch is assumed to be locked. Second, the oncoming clutch hydraulic system is modeled for purpose of learning control design as a first order linear system described by the steady state gain $K_{onc}$ and time-constant $\tau_{one}$. Third, the output inertia is assumed to be small and the driveline is assumed to be rigid. Fourth, the change in vehicle speed is assumed to be zero during the gearshift. Fifth, the longitudinal slip of the powered wheels is assumed to be zero. Under these assumptions, the resulting control-oriented powertrain models during the torque and inertia phases are described in (1) and (2) respectively, where $\Delta T_s$, $\Delta P_{onc}^c$, and $\omega_{onc}$ denote the change in the driveshaft torque—the output to be controlled during the torque phase, the change in the oncoming clutch pressure command—the control input, and the oncoming clutch slip speed—the output to be controlled during the inertia phase, respectively. The change in the driveshaft torque over the torque phase, and change of oncoming clutch slip speed during the inertia phase constitutes the gearshift output set $\psi=[\Delta T_s \omega_{onc}]^T$. The goal of automated calibration and adaptation during operation is to learn the control parameters such that $\psi$ converges to $\psi^*$, the desired gearshift output set. The parameters $I_e$, $I_t$, $b_e$, $r_1$, $r_2$, and $r_d$ denote the engine inertia, turbine inertia, engine damping coefficient, first gear ratio, second gear ratio, and final drive ratio respectively. The changes in the driveshaft torque and oncoming clutch pressure command are computed with respect to their values at the start of the torque phase. The reduced order models (1) and (2) will be used to compute learning controllers for the automated calibration of gearshift controller parameters.

$$\Delta T_s(s) = -\frac{r_2 - r_1}{r_1 r_2 r_d} \frac{K_{onc}}{\tau_{onc} s + 1} \Delta P^c_{onc}(s) \quad (1)$$

$$\omega_{onc}(s) = -\frac{1}{(I_e + I_t)s + b_e} \frac{K_{onc}}{\tau_{onc} s + 1} \Delta P^c_{onc}(s) \quad (2)$$

A model-based iterative learning method is now described for automating the calibration of gearshift controllers. The idea involves using an electronically controlled dynamometer for automatically executing a gearshift repeatedly, and iteratively learning the required feedforward control parameters. More specifically, for every allowed gear ratio transition, the gearshift is performed at multiple operating conditions of vehicle speed and engine torque repeatedly and, using the learning controller computed via the design methods presented herein, iterative tuning of the control parameters stored in look-up tables is performed automatically.

Iterative learning control is a model-based learning method that uses simple learning controllers computed via simple and potentially inaccurate models of the underlying systems. The hybrid nature of the gearshifting process and shape-constraints on the control input resulting from the use of look-up tables are two challenges in the application of iterative learning control (ILC) for gearshift control calibration. The inventors have extended the theory of ILC to hybrid systems, which, in conjunction with the formulation of ILC for systems with shape-constrained control inputs used here, are used in this invention to compute learning controllers for the automated calibration and adaptation of gearshift controllers.

As the task of output trajectory tracking is best described by an input-output model of the underlying physical system, the super-vector approach of system representation that allows the treatment of an essentially two-dimensional system in the time and trial domains as a one-dimensional system (in lifted form) in the trial domain are used. A discrete-time (DT) SISO linear system during the $j^{th}$ trial of length N corresponding to the sampling time step $t_s$ and trial duration T is represented in lifted form as $y^i = Hu^i + D$, where the DT input and output trajectories $y^i$ and $u^i$ are represented as N-dimensional vectors, known as super-vectors, the (causal) input-output model is represented by a lower-triangular matrix H, which is Toeplitz (see equation (3)), if the underlying system is time-invariant, and D represents the contribution of initial condition $x_0$ to the system output $y^i$. The matrix H is commonly referred to as the Markov matrix. The Markov matrix H is made up of DT finite impulse response of the underlying linear time-invariant system represented by the DT triplet (C,A,B), i.e., $h_1 = CB$, $h_2 = CAB \ldots h_N = CA^{N-1}B$ with $h_1 \neq 0$.

$$H = \begin{bmatrix} h_1 & 0 & 0 & \ldots & 0 \\ h_2 & h_1 & 0 & \ldots & 0 \\ h_3 & h_2 & h_1 & \ldots & 0 \\ \vdots & \ddots & h_2 & h_1 & \vdots \\ h_N & h_{N-1} & \ldots & h_2 & h_1 \end{bmatrix} \quad D = \begin{bmatrix} Cx_0 \\ CAx_0 \\ CA^2 x_0 \\ \vdots \\ CA^{N-1} x_0 \end{bmatrix} \quad (3)$$

A lifted form representation of a class of hybrid systems described by a set of trial-invariant DT linear time-invariant state space realizations ($C_i$, $A_i$, $B_i$), $i = 1 \ldots m$, and corresponding input-output dependent switching rules determining the transition of system output from one linear vector field to another, is described in equations (4)-(8), where $\mathcal{H}^j$ the hybrid Markov matrix, $U^j$ and $Y^j$ denote the DT input and output trajectories during the $j^{th}$ trial respectively, $D^j$ represents the contribution of non-zero initial conditions to the system output $Y^j$, $y_i^j$, $u_i^j$, $i = 1 \ldots m$, $n_i^j$ denote the DT durations for which the underlying hybrid system is represented by $i^{th}$ mode, $H_i^j$ represent the Markov matrices for ($C_i, A_i, B_i$), $H_{pl}^j$, $p = 2 \ldots m$, $l = 1 \ldots p-1$, and the matrix operator $\mathcal{R}^k$ [ ] denotes the $k^{th}$ row of its argument, $k = 1 \ldots n_p^j$. Owing to the assumption of input-output dependent switching rules, $n_i^j$ are trial-varying, which implies that $\mathcal{H}^j$ and $D^j$ are trial-varying.

$$Y^j = \mathcal{H}^j U^j + D^j \quad (4)$$

$$Y^j = \begin{bmatrix} y_1^j & y_2^j & \ldots & y_m^j \end{bmatrix}^T, U^j = \begin{bmatrix} u_1^j & u_2^j & \ldots & u_m^j \end{bmatrix}^T \quad (5)$$

$$\mathcal{H}^j = \begin{bmatrix} H_{11}^j & 0 & \ldots & 0 \\ H_{21}^j & H_{22}^j & \ldots & 0 \\ \vdots & \vdots & \ddots & 0 \\ H_{m1}^j & H_{m2}^j & \ldots & H_{mm}^j \end{bmatrix}, D^j = \begin{bmatrix} C_1^j x_0 \\ C_2^j A_1^{n_1^j} x_0 \\ \vdots \\ C_m^j A_{m-1}^{n_{m-1}^j} \ldots A_2^{n_2^j} A_1^{n_1^j} x_0 \end{bmatrix} \quad (6)$$

$$\mathcal{R}^k [H_{pl}^j] = \begin{cases} C_p A_p^k \left( A_{p-1}^{n_{p-1}^j} A_{p-2}^{n_{p-2}^j} \ldots A_{l+1}^{n_{l+1}^j} \right) B_l^j & \text{if } l < p-1 \\ C_p A_p^k B_l^j & \text{if } l = p-1 \end{cases} \quad (7)$$

$$B_l^j = \begin{bmatrix} A_l^{n_l^j - 1} B_l & \ldots & A_l B_l & B_l \end{bmatrix}, C_i^j = \begin{bmatrix} C_i & C_i A_i & \ldots & C_i A_i^{n_i^j} \end{bmatrix}^T \quad (8)$$

A lifted form representation of the powertrain during the torque and inertia phases, a hybrid system with two modes, m=2, is developed using the powertrain models described in (1) and (2), the continuous-time state-space realizations for which are denoted by the triplets ($C_1^c$, $A_1^c$, $B_1^c$) and ($C_2^c$, $A_2^c$, $B_2^c$) respectively, and described in equations (9) and (10) respectively. The lifted form representation is a hybrid Markov matrix that is computed using equations (4)-(8).

$$A_1^c = -\frac{1}{\tau_{onc}}, B_1^c = \frac{K_{onc}}{\tau_{onc}}, C_1^c = -\frac{r_2 - r_1}{r_1 r_2 r_d} \quad (9)$$

$$A_2^c = \begin{bmatrix} -\frac{1}{I_e + I_t} b_e & -\frac{1}{I_e + I_t} \\ 0 & -\frac{1}{\tau_{onc}} \end{bmatrix}, B_2^c = \begin{bmatrix} 0 \\ \frac{K_{onc}}{\tau_{onc}} \end{bmatrix}, C_2^c = [1 \ 0] \quad (10)$$

The switching occurs in the A-matrix, resulting from the release of the offgoing clutch, and in the C-matrix, resulting from the change in the system output to be controlled. The hybrid Markov matrix $\mathcal{H}^j$ is N times N, where N denotes the sum of the desired durations of the torque and inertia phases, maps the change in oncoming clutch pressure command $[\Delta P_{onc}^c(1) \Delta P_{onc}^c(2) \ldots \Delta P_{onc}^c(N)]^T = U^j$ to the change in driveshaft torque $[\Delta T_s(1) \Delta T_s(2) \ldots \Delta T_s(N_1^j)]^T = Y_1^j$ during the torque phase (mode index 1) and oncoming clutch slip speed $[\omega_{onc}(1) \omega_{onc}(2) \ldots \omega_{onc}(N)]^T = U^j(N^j - N_1^j)] = Y_2^j$ during inertia phase (mode index 2) of the $j^{th}$ gearshift (trial). Here, $N_1^i$ denotes the switching time instant at which the powertrain switches from the torque to the inertia phase, and $N^j$ denotes the sum of the durations of the torque and inertia phases during the $j^{th}$ gearshift. Let $Y^j=[Y_1^{jT}Y_2^{jT}]^T$. An early termination of gearshifts, i.e., $N_j<N$, is possible, for example, for power-on upshifts, excessive oncoming clutch pressure command levels in the inertia phase during iterative learning may result in abrupt clutch lock-up and a shortened trial duration. For gearshifts with shortened durations, the rows and columns of the corresponding hybrid Markov matrix $\mathcal{H}^j$ with indices greater than $N^j$ are set equal to zero, and $N-N^j$ zeros are added to the measured output trajectory so that $Y^j$ is N-dimensional. The desired outputs during the torque and inertia phases are denoted by $Y_1^\infty$ and $Y_2^\infty$ respectively, the concatenation of which is denoted by the desired trajectory $Y^\infty$, and the tracking error $E^j=Y^\infty-Y^j$.

The desired time instant for the release of offgoing clutch, i.e., switching from the torque to the inertia phase, is denoted by $N_1$, which is the length of $Y_1^\infty$. The hybrid Markov matrix in (4)-(8) with $N_1^i=N_1$ and $N^j=N$ is denoted by $\mathcal{H}^\infty$. Similarly, $D^\infty$ is defined. It is expected that, as the oncoming clutch pressure command during the torque phase is iteratively tuned, the switching time instant $N_1^j$ will be trial-varying. It is reasonable to assume that the switching time instant $N_1^j$ is lower-bounded, i.e., $\underline{N_1}<=N_1^j$ for all j since, due to the limitations on actuator dynamics, the clutch pressures cannot be changed instantaneously. It should be noted that $N_1^j<=N_1$ since, during iterative learning of the command pressure for the oncoming clutch, the offgoing clutch is configured to completely release at $N_1$, implying that the torque phase ends before or at $N_1$ for all trials, i.e., for all j.

Similar to the assumption on $N_1^i$, $N^j$ can be assumed to be lower-bounded as well, i.e., $\underline{N}<=N^j$. However, unlike the torque phase, the gearshift may extend beyond N, resulting from a long inertia phase. In one example, the inertia phase is terminated forcibly after N discrete time steps, allowing for the assumption $N^j<=N$ for all j. Even without considering such forced termination routines, for trials with duration greater than N, the first N elements of the system trajectories can always be used fir iterative learning. In addition, $N^j$ is assumed to be lower bounded by $N_1$, which is satisfied in practice due to the limitations of clutch hydraulics dynamics. The bounds on $N_1^j$ and $N^j$ imply that the hybrid Markov matrix representing a powertrain during gearshifting is known to belong to a finite set $H=\{\mathcal{H}^j:N_1^j=\underline{N_1} \ldots N_1$ and $N^j=\underline{N} \ldots N\}$. In order to compute this set, two nested for loops are used, using which $\mathcal{H}^j$ is computed for each combination of $N_1^j$ and $N^j$.

The use of look-up tables for parametrization of feedforward control naturally results in shape constraints on the control input trajectory, as illustrated by the oncoming clutch pressure command in FIG. 3, the trajectory for which is parametrized by $p_3$, $p_4$, and other parameters. One calibration approach involves fixing the time durations of different phases, and tuning the corresponding pressure values, the twofold motivation for such an approach being, first, the desired durations of different phases, usually known from experience, are easily specified and, second, the number of required calibration parameters are reduced. Because this description presents the calibration approaches for feedforward control of torque and inertia phases, the parameters $p_3$ and $p_2$ are required to be automatically tuned.

Figure 5:
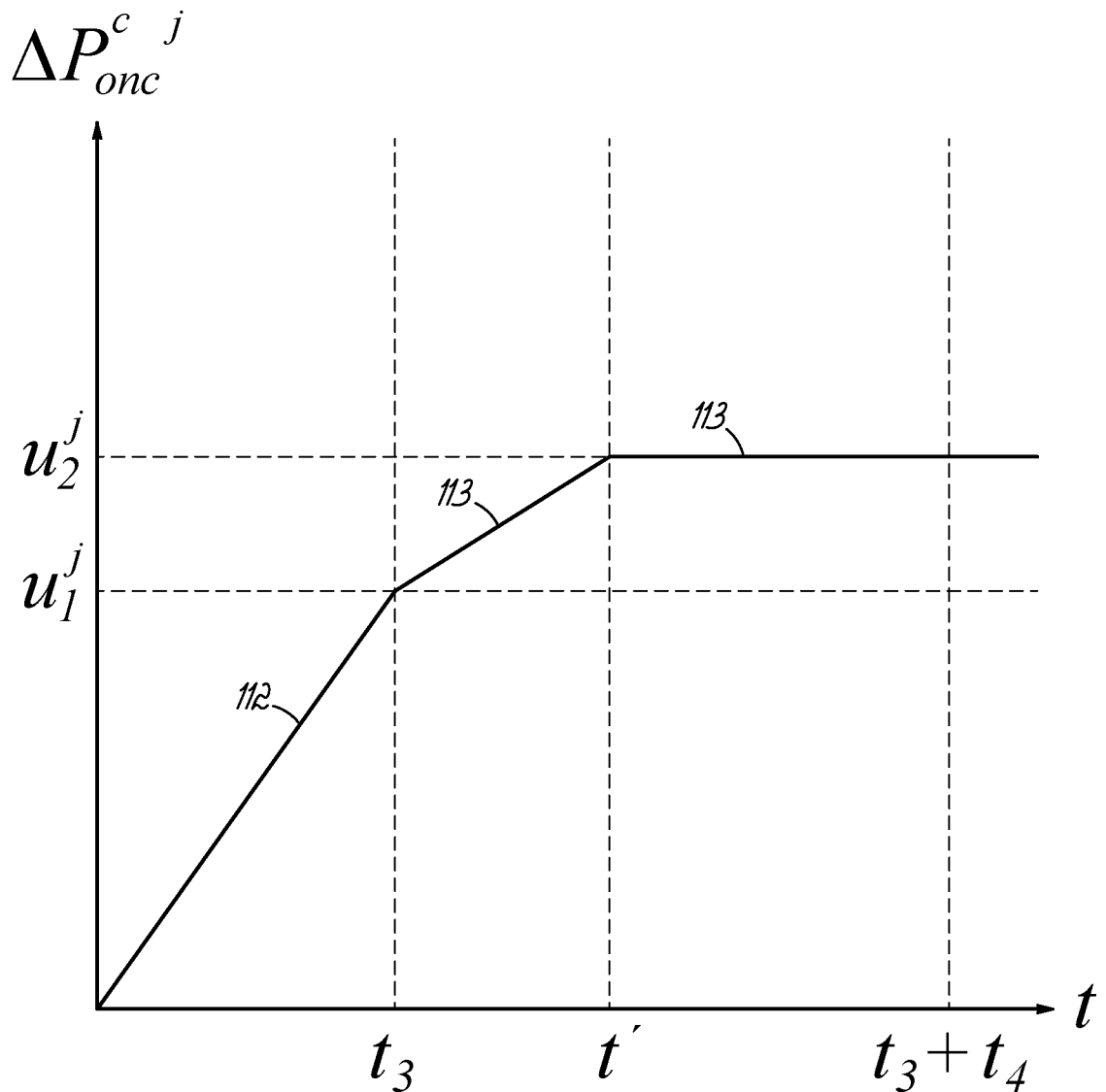
FIG. 5 is a representative plot of the oncoming clutch pressure command as a function of time.

The shape constrained control input $\Delta P_{onc}^{cj}$ during the torque and inertia phases of the $j^{th}$ trial is shown in FIG. 5, where, for fixed time parameters $t_1$, $t_2$ and T, where $t_1=N_1 t_s$ and $T=N t_s$, the parameter $u_1$ constrains the commanded oncoming clutch pressure to follow a ramp shape during the torque phase and, the parameter $u_2$, a terminated ramp shape during the inertia phase, the terminated ramp during the inertia phase being a continuation of the ramp during the torque phase, The parameters $p_3$ and $p_4$ of FIG. 5 are related to $u_1$ and $u_2$ as $p_3=u_1+p_2$ and $p_4=u_2+p_2$, where $p_2$ represents the value of oncoming clutch pressure command at the end of the fill phase. As the calibration of fill phase control parameters is assumed to be performed prior to the calibration of torque and inertia phase control parameters, the pressure value $p_0$ and other fill phase control parameters are assumed to result in good fill phase control and are left unchanged during iterative learning. The parameters $t_1$ and T denote the desired torque phase duration and sum of the desired durations for the torque and inertia phases respectively. In addition, the ramp segment during the torque phase is required to start from 0, which ensures a smooth change from the pressure $p_2$ at the end of the fill phase to the commanded pressure $p_3$ at the end of the torque phase.

A Markov matrix during the $j^{th}$ trial with shape-constrained inputs is described here using a projection matrix $T_u$. The shape-constrained control input $\Delta P_{onc}^{cj}$, represented by 112 and 113 in FIG. 5, is represented using the projection matrix $T_u$ described in (11), where $N_1 t_s=t_1$ and $N_2 t_s=t_2-t_1$, and $t_s$ denotes the zero-order-hold sampling time-step. In FIG. 5, the ramp during the torque phase is represented by 112 and the terminated ramp (in continuation) during the inertia phase is represented by 113, It is recalled that the discrete time $N_1$ denotes the desired time instant for switching from the torque to the inertia phase. The projection matrix $T_u$ maps the parameters $U_r^i=[u_1^i u_2^i]^T$ (a two dimensional vector) to the discrete-time trajectory of the control input $U^j$ (N dimensional vector) during the $j^{th}$ trial. Here, $Nt_s=T$, where T denotes the sum of desired durations of the torque and inertia phases.

$$T_u = \begin{bmatrix} 0 & \frac{1}{N_1} & \cdots & \frac{N_1-1}{N_1} & 1 & 1-\frac{1}{N_2} & \cdots & 1-\frac{N_2-1}{N_2} & 0 & 0 & \cdots & 0 \\ 0 & 0 & \cdots & 0 & 0 & \frac{1}{N_2} & \cdots & \frac{N_2-1}{N_2} & 1 & 1 & \cdots & 1 \end{bmatrix}^T \quad (11)$$

The first row of zeros in $T_u$ constrains $U^j(1)=0$ for all j, the rows of $T_u$ indexed by $k=2 \ldots N_1+1$ and $k=N_1+2 \ldots N_1+N_2+1$ linearly interpolate the corresponding elements of $U^j$ between 0 and $u_1^j$, and $u_1^j$ and $u_2^j$, respectively, and the remaining rows of $T_u$ equate the corresponding elements of $U^j$ to $u_2^j$. The shape-constrained hybrid Markov matrix His defined in equation (12), where $\mathcal{H}^j$ denotes the hybrid Markov matrix modeling the powertrain during the $j^{th}$ trial of the gearshift, as described earlier. Natural number $N_u$ denotes the number of parameters required for describing the shape constrained control input $U^j$, which is equal to 2 for the input shown in FIG. 5 (112 and 113). For systems with shape-constrained inputs, the system output $Y^j$, described in (13), can only track the desired trajectories $Y^\infty$ that are feasible $$\mathcal{H}^{scj} = \mathcal{H}^j T_u, \quad T_u \in \mathbb{R}^{N \times N_u} \quad (12)$$

$$Y^j = \mathcal{H}^{scj} U_r^j + D^j \quad (13)$$

For control design, a squaring-down approach is used here to derive a lifted form representation of the shape-constrained Markov matrix $\mathcal{H}^{scj}$ ($N_u$ times $N_u$, using which a learning controller $L_r$ is computed. The resulting controller ensures the convergence of $E_r^j$ to zero, where $E_r^j$ denotes a projection of the tracking error $E^j$ onto smaller $N_u$ dimensional space. It is noted that $N>>N_u$. For the shape-constrained hybrid Markov matrix $\mathcal{H}^{scj}$, the lifted form representation is denoted by $\mathcal{H}_r^j$ and described in equation (14), where $T_y^j$ projects the system output $Y^j$ onto $N_u$ dimensional space and squares down the non-square shape-constrained hybrid Markov matrix $\mathcal{H}^{scj}$.

$$\mathcal{H}_r^j = T_y^j \mathcal{H}^{scj} \tag{14}$$

For the application of gearshift control, a natural choice of $T_y^j$ exists. Because only one control parameter is calibrated per gearshift phase, one point is sampled from the measured output trajectories $Y_1^j$ and $Y_2^j$ during the two phases. The trial-varying output projection matrix $T_y^j$ for the $j^{th}$ trial is a matrix of size $N_u$ times $N$ with all entries equal to zero except those represented by the row-column index pairs $(1, N_1^j)$ and $(2, N^j)$, which are equal to 1. It can be verified that the reduced Markov matrix $\mathcal{H}_r^j = T_y^j \mathcal{H}^j T_u$ is lower triangular, which facilitates control design greatly, as will be discussed shortly. A learning controller $L_r$ ensuring the convergence of the projected tracking error $E_r^j$ to zero is designed next using three methods.

The learning control law described in equation (15) is proposed here for iterative learning control of hybrid systems with shape-constrained control inputs. As $N_u=2$ for the application of gearshift control, $U_r^j$, $E_r^j$ are two dimensional.

$$U_r^{j+1} = U_r^j + L_r E_r^j \tag{15}$$

Trial-invariance of i) system dynamics of powertrains during gearshifting, ii) initial conditions for gearshifting, and iii) the desired reference trajectory $Y^\infty$ to be tracked are assumed for control design. Trial-invariance of trial duration, i.e., gearshift duration, is not assumed here, per the discussion regarding abrupt clutch lock-ups presented earlier. It is assumed here that there exist a control input $U_r^\infty$ such that the equality in equation (16) holds.

$$Y^\infty = \mathcal{H}^{sc\infty} U_r^\infty + D^\infty \tag{16}$$

This assumption establishes the existence of a control input $U_r^\infty$ such that a desired trajectory $Y^\infty$ can be tracked by the output of the shape constrained hybrid system $\mathcal{H}^{sc\infty}$, and is standard in ILC literature.

The philosophy of control design is described next. The evolution of $\delta U_r^j$, denoting the difference of the desired control input $U_r^\infty$ and the $j^{th}$ trial control input $U_r^j$ in the trial domain, is governed by the discrete-time dynamics in equation (17).

$$\delta U_r^{j+1} = (I - L_r \mathcal{H}_r^j) \delta U_r^j + L_r T_y^j (\mathcal{H}^j - \mathcal{H}^\infty) T_u U_r^\infty + L_r T_y^j (D^j - D^\infty) \tag{17}$$

Note that for $\mathcal{H}^j = \mathcal{H}^\infty$ and $D^j = D^\infty$, $U_r^\infty = 0$ is an equilibrium of equation (17). The use of a Lyapunov framework for the design of learning controllers that ensure the stability of trial-varying internal dynamics $I - L_r \mathcal{H}_r^j$, with $\mathcal{H}_r^j$ in $H_r$, is proposed here. The set of closed-loop systems $I - L_r \mathcal{H}_r^j$, with $\mathcal{H}_r^j$ in $H_r$, in equation (17) is said to be quadratically stable if a Lyapunov function $P_r = P_r^T > 0$ (positive definite) exists such that the set of inequalities in (18) is satisfied, where $\mathcal{R}$ denotes the radius of the disc in which the eigenvalues of $I - L_r \mathcal{H}_r^j$, with $\mathcal{H}_r^j$ in $H_r$ are placed, such placement controlling the rate of convergence of $\delta U_r^j$ to zero. As $H_r$ is a finite set, the number of inequalities in (21), equal to the cardinality of $H_r$, is also finite. In the first embodiment of the proposed design method presented here, the causal controller is computed as $L_r = P_r^{-1} Q_r$, $P_r$ and $Q_r$ being solutions to the finite set of LMIs in (18), where $\mathcal{D}$ and $\mathcal{L}$ denote the set of all diagonal and lower triangular matrices of size $N_u$ times $N_u$ respectively $$(I - L_r \mathcal{H}_r^j)^T P_r (I - L_r \mathcal{H}_r^j) - \mathcal{R}^2 P_r < 0 \forall \mathcal{H}_r^j \in \mathcal{H}_r \tag{18}$$

-continued $$\begin{bmatrix} -\mathcal{R} P_r & (P_r - Q_r \mathcal{H}_r^j)^T \\ P_r - Q_r \mathcal{H}_r^j & -\mathcal{R} P_r \end{bmatrix} < 0, P_r \in D, Q_r \in \mathcal{L}, \mathcal{H}_r^j \in \mathcal{H}_r \tag{19}$$

In another embodiment of the design method, the set $\mathcal{H}_r^j$ is (conservatively) represented as a lower triangular interval system $H_r^j = \{\mathcal{H}_r^j : \mathcal{H}_r^{Min} \leq \mathcal{H}_r^j \leq \mathcal{H}_r^{Max}\}$, where $\leq$ here denotes the element-wise less than or equal to operation, and $\mathcal{H}_r^{Min}$ and $\mathcal{H}_r^{Max}$ denote the bounding matrices of the interval. Conservatism is introduced since $H_r$ is a subset of $H_r^j \$$, but this also implies increased robustness of the second design to modeling errors. It is fairly straight-forward to show that a lower-triangular interval system can be equivalently represented as a convex hull of $N_v$ vertex matrices $N_v = 2^{(Nu(Nu+1))/2}$. The lower-triangular vertex matrices are derived using $\mathcal{H}_r^{Min}$ and $\mathcal{H}_r^{Max}$. For the application of gearshift control, because $N_u = 2$, $N_v = 8$, and the vertex matrices ( ), wherein the matrix elements are elements of $\mathcal{H}_r^{Min}$ and $\mathcal{H}_r^{Max}$. A causal learning controller for stabilization of the set $H_r^I$ is computed using (18) and (19) but for the system matrices in (20).

$$\begin{bmatrix} \overline{\mathcal{H}}_r^{11} & 0 \\ \overline{\mathcal{H}}_r^{21} & \overline{\mathcal{H}}_r^{22} \end{bmatrix} \begin{bmatrix} \overline{\mathcal{H}}_r^{11} & 0 \\ \overline{\mathcal{H}}_r^{21} & \underline{\mathcal{H}}_r^{22} \end{bmatrix} \begin{bmatrix} \overline{\mathcal{H}}_r^{11} & 0 \\ \underline{\mathcal{H}}_r^{21} & \overline{\mathcal{H}}_r^{22} \end{bmatrix} \begin{bmatrix} \overline{\mathcal{H}}_r^{11} & 0 \\ \underline{\mathcal{H}}_r^{21} & \underline{\mathcal{H}}_r^{22} \end{bmatrix} \tag{20}$$

$$\begin{bmatrix} \underline{\mathcal{H}}_r^{11} & 0 \\ \underline{\mathcal{H}}_r^{21} & \underline{\mathcal{H}}_r^{22} \end{bmatrix} \begin{bmatrix} \underline{\mathcal{H}}_r^{11} & 0 \\ \underline{\mathcal{H}}_r^{21} & \overline{\mathcal{H}}_r^{22} \end{bmatrix} \begin{bmatrix} \underline{\mathcal{H}}_r^{11} & 0 \\ \overline{\mathcal{H}}_r^{21} & \underline{\mathcal{H}}_r^{22} \end{bmatrix} \begin{bmatrix} \underline{\mathcal{H}}_r^{11} & 0 \\ \overline{\mathcal{H}}_r^{21} & \overline{\mathcal{H}}_r^{22} \end{bmatrix}$$

The major difference between automated calibration and online adaptation from the perspective of iterative learning control application is that for automated calibration, the gearshift conditions, i.e., the engine torque and vehicle speed during the gearshift, are accurately controlled to be repetitive and equal to the break-points of the look-up tables in which the control parameters $p_3$ and $p_4$ are stored. In contrast to this, for the application of online adaptation, where gearshift control parameters are learned during normal vehicle operation, gearshifts occur randomly at different operating conditions.

The main technical challenge in implementing the hybrid ILC controller described earlier (for automated calibration) relates to the fixed values of engine torque and vehicle speed at which these gearshifts with potential for adaptation are executed. More specifically, as look-up tables are constructed using a finite number of break points of engine torque and vehicle speed (see FIG. 4 for one representative example of a look-up table), it is clear that the fixed values of the engine torque and vehicle speed under which gearshifts are executed will not be equal to the break points of the look-up tables used to store the feedforward control parameters $p_3$ and $p_4$. Thus, a method is required to update the control parameters stored in the look-up tables using gearshifts that do not occur at operating conditions used for constructing these look-up tables.

The control parameter $p_3$ is stored as a function of the engine torque and $p_4$ is stored as a function of vehicle speed. The break-points are used to store the control parameter $p_3$ be denoted by $T_e^\gamma$, $\gamma = 1 \ldots N_{Te}$, where $N_{Te}$ denote the total number of break-points or engine torque values used for storing $p_3$. Similarly, let $V^\gamma$, $\gamma = 1 \ldots N_V$, where $N_v$ denote the total number of break-points of vehicle speed values used for storing $p_4$. Let $p_3^\gamma$ and $p_4^\gamma$ denote the values of control parameters $p_3$ and $p_2$ corresponding to these break-points respectively. As gearshifts occur multiple times during vehicle operation, the performance of the stored parameters may be evaluated after every occurrence or repetition, or trial of iterative learning, and updated for improved gearshift quality. The operating conditions $T_e^\gamma$ and $V^\gamma$ are packed in a two dimensional vector $C^\gamma [T_e^\gamma V^\gamma]^T$.

Figure 4:
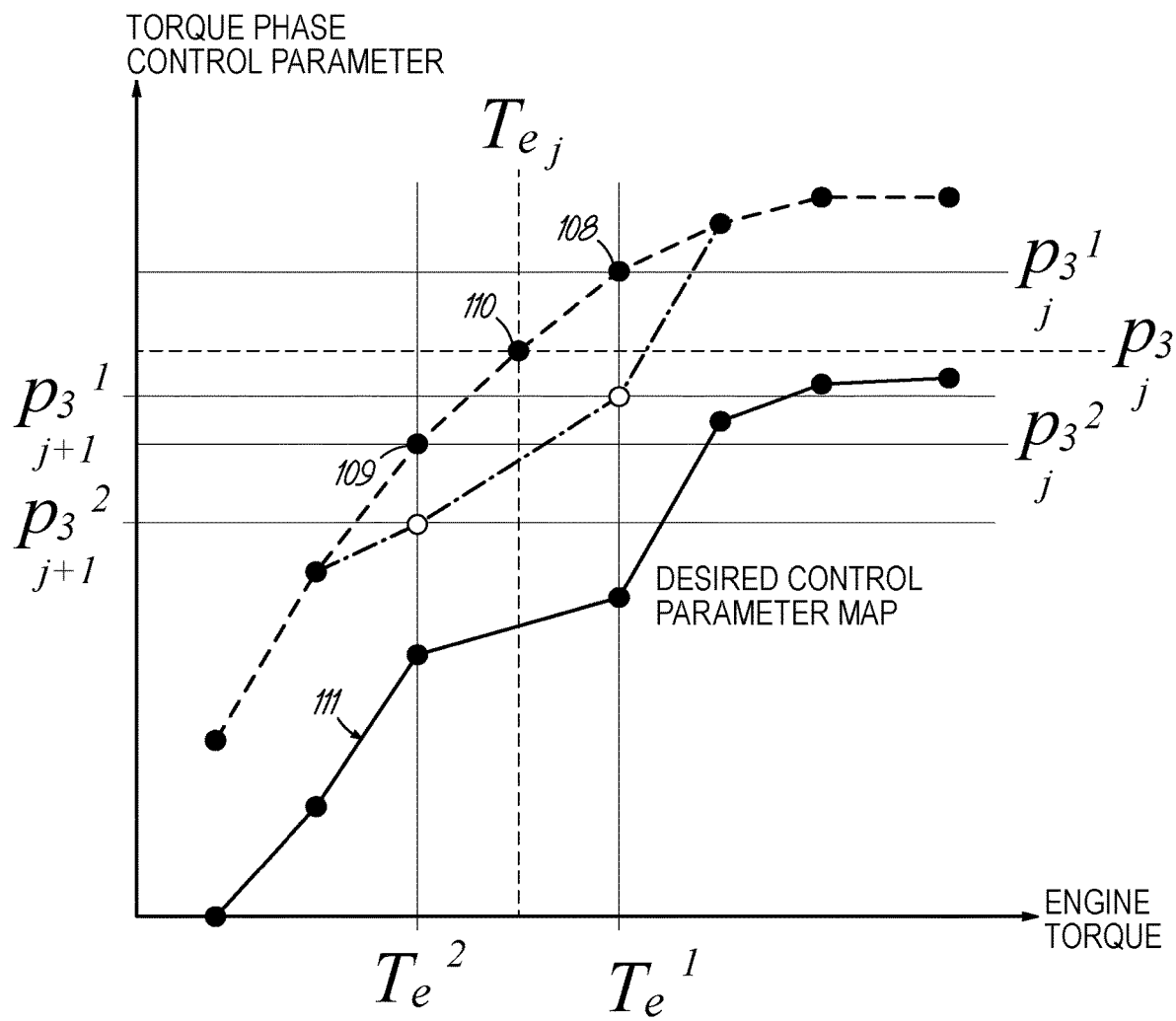
FIG. 4 is a representative plot of the torque phase control parameter stored as a function of the engine torque.

Iterative learning laws for adaptation of the gearshift control parameters $p_{3j}^\gamma$ and $p_{4j}^\gamma$—the values of the stored control $p_3^\gamma$ and $p_4^\gamma$ during $J^{th}$ trial or iteration, are described next. Here, starting from the inaccurate control parameter values $p_{3\,0}^\gamma$ and $p_{4\,0}^\gamma$ the goal is to iteratively learn the accurate (optimal) values $p_{3\,\infty}^\gamma$ and $p_{4\,\infty}^\gamma$. Consider the adaptation of $p_{3j}^\gamma$ first. For control of gearshifts during normal vehicle operation, the control parameter value $p_{3j}$ corresponding to the engine torque $T_{ej}$ is computed via linear interpolation of the control parameter values $p_{3j}^1$ and $p_{3j}^2$. In FIG. 4, $p_{3j}^1$ and $p_{3j}^2$ are represented by 108 and 109 respectively, and $p_{3j}$ is represented by 110. The desired control parameter values $p_3^{\gamma\infty}$ is represented by 111 in FIG. 4. For adaptation of the stored control values $p_{3j}^1$ and $p_{3j}^2$, the data from the gearshift at the engine torque value $T_{ej}$ is proposed to be used. More specifically, after a gearshift at the engine torque value $T_{ej}$ is executed, the learning control law in equation (21) is used to compute $p_{3j+1}'$ that is used to compute $p_{3j+1}^1$ and $p_{3j+1}^2$ using (22) and (23) respectively. Here, $L_T$ is the learning controller for the torque phase, and $\Delta T_{s\infty}$ and $\Delta T_{sj}$ are the desired and $j^{th}$ trial driveshaft torque drops during the torque phase.

$$p'_{3_{j+1}} = L_T(\Delta T_{s\infty} - \Delta T_{sj}) \quad (21)$$

$$p^1_{3_{j+1}} = \frac{T_e^1 - T_{ej}}{T_e^2 - T_e^1} p'_{3_{j+1}} \quad (22)$$

$$p^2_{3_{j+1}} = \frac{T_{ej} - T_e^2}{T_e^2 - T_e^1} p'_{3_{j+1}} \quad (23)$$

Similarly, the adaptation law for the inertia phase is described in (24)-(26).

$$p'_{4_{j+1}} = p_{4_j^1} + L_I(\Delta\omega_{onc\infty} - \Delta\omega_{oncj}) \quad (24)$$

$$p'_{4_{j+1}} = \frac{V^1 - V_j}{V^2 - V^1} p'_{4_{j+1}} \quad (25)$$

$$p'_{4_{j+1}} = \frac{V_j - V^2}{V^2 - V^1} p'_{4_{j+1}} \quad (26)$$

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is, therefore, not limited to the specific details, the representative apparatus and method, and illustrative examples shown and described. Accordingly, departures may be made from such details without departing from the spirit or scope of the Applicant's general inventive concept.

What is claimed is:

1. A method for automated calibration of a gearshift controller in an automatic transmission having one or more speed sensors, each configured to generate a signal, and allowing one or more gearshifts with associated gearshift output sets $y_j^i$, that are functions of the speed sensor signals and desired gearshift output sets $y_\infty^i$, the gearshift controller having one or more gearshift control parameter sets $U_{rj}^i$ to be calibrated, each gearshift control parameter set including gearshift control parameters for an allowed gearshift at one operating condition, and learning controllers $L_i$, sets $H_r$ of system models $H_i$, identity matrix 1, and positive definite matrices $P_i$ for updating $U_{rj}^i$ during a sequences sequence of allowed gearshifts, the method comprising:
   (a) acquiring the speed sensor signals post-completion of one gearshift from the sequence of allowed gearshifts;
   (b) computing a gearshift output set $y_i$ using the acquired speed sensor signals; and
   (c) updating the gearshift control parameter set $U_{rj}^i$ according to (i) and (ii) for a next gearshift in the sequence of allowed gearshifts;

$$U_{rj+1}^i = U_{rj}^i + L_i(y_\infty^i - y_j^i) \quad \text{(i)}$$

$$(I - L_i H_i)^T P(I - L_i H_i) - P < 0, \text{ for all } H_i \text{ in } H_i \quad \text{(ii)}$$

2. A method for adaptation of a gearshift controller in an automatic transmission having one or more speed sensors, each configured to generate a signal, and allowing one or more gearshifts with associated gearshift output sets $y_j^i$ that are functions of the speed sensor signals and desired gearshift output sets $y_\infty^i$, the gearshift controller having one or more gearshift control parameter sets $U_{rj}^i$ for control of the allowed gearshifts during vehicle operation and stored in look-up tables as functions of one or more operating conditions $C^i$, and learning controllers $L_i$, $H_r$ sets of system models $H_i$, identity matrix 1, and positive definite matrices $P_i$ for updating the one or more gearshift control parameter sets $U_{rj}^i$ corresponding to the operating conditions C' during a sequence of allowed gearshifts, the sequence of the allowed gearshifts occurring at operating conditions $C_j$, that are the same or different than C', the method comprising:
   (a) acquiring the speed sensor signals post-completion of an allowed gearshift at an operating condition $C_j$;
   (b) computing a gearshift output set $y_j^i$ using the acquired speed sensor signals;
   (c) computing a correction $\delta u_j$ according to (i) and (ii) for a next gearshift in the sequence of allowed gearshifts; and $$\delta u_j = L_i(y_\infty^i - y_j^i) \quad \text{(i)}$$

$$(I - L_i H_i)^T P(I - L_i H_i) - P < 0, \text{ for all } H_i \text{ in } H_i \quad \text{(ii)}$$

(d) distributing the computed correction $\delta u_j$ to the control parameter sets $U_{rj}^{i-1}$ and $U_{rj}^i$ corresponding to one or more operating conditions $C^{i-1}$ and $C^i$ that surround and are closest to the operating condition $C_j$ for the allowed gearshift.

\* \* \* \* \*

UNITED STATES PATENT AND TRADEMARK OFFICE
CERTIFICATE OF CORRECTION

| | |
|---|---|
| PATENT NO. | : 11,846,348 B2 |
| APPLICATION NO. | : 18/027705 |
| DATED | : December 19, 2023 |
| INVENTOR(S) | : Krishnaswamy Srinivasan et al. |

It is certified that error appears in the above-identified patent and that said Letters Patent is hereby corrected as shown below:

In the Specification

Column 7, Line 55, reads "The Markov matrix His made up of..." and should read -- The Markov matrix H is made up of... --

Column 9, Line 38, reads "can always be used fir iterative learning." and should read -- can always be used for iterative learning. --

Column 10, Line 45, reads "...The shape-constrained hybrid Markov matrix His..." and should read -- ...The shape-constrained hybrid Markkov matrix H is... --

Column 10, Line 61, reads "...($N_u$ times $N_u$, using which" and should read -- ...($N_u$ times $N_u$), using which --

Column 12, Lines 60-61, read "the control parameter $p_3$ be denoted by..." and should read -- the control parameter $p_3$ denoted by... --

Column 12, Line 61, reads "...denote the total" and should read -- ...denotes the total --

Column 12, Lines 63-64, read "...denote the total number of..." and should read -- ...denotes the total number of... --

Column 13, Lines 18-19, read "...is represented by 111 in Fig. 4" and should read -- ...are represented by 111 in FIG. 4. --

In the Claims

Column 14, Line 17, Claim 1, reads "(b) computing a gearshift output set yi using the acquired" and should read -- (b) computing a gearshift output set $y_j^i$ using the acquired --

Signed and Sealed this
Nineteenth Day of March, 2024

Katherine Kelly Vidal
*Director of the United States Patent and Trademark Office*